(12) United States Patent
Alkandari

(10) Patent No.: US 9,732,878 B2
(45) Date of Patent: Aug. 15, 2017

(54) PARTIAL STROKE TESTING SYSTEM FOR EMERGENCY SHUT-OFF VALVES

(71) Applicant: Hassan Abdullah Ahmad Alkandari, Al-Shaab (KW)

(72) Inventor: Hassan Abdullah Ahmad Alkandari, Al-Shaab (KW)

( * ) Notice: Subject to any disclaimer, the term of this patent is extended or adjusted under 35 U.S.C. 154(b) by 0 days.

(21) Appl. No.: 14/992,274

(22) Filed: Jan. 11, 2016

(65) Prior Publication Data

US 2017/0198829 A1    Jul. 13, 2017

(51) Int. Cl.
*G01L 27/00* (2006.01)
*G01M 3/02* (2006.01)
*F16K 37/00* (2006.01)

(52) U.S. Cl.
CPC .................................. *F16K 37/00* (2013.01)

(58) Field of Classification Search
None
See application file for complete search history.

(56) References Cited

U.S. PATENT DOCUMENTS

| | | |
|---|---|---|
| 6,435,022 B1 | 8/2002 | Albuaijan |
| 6,935,610 B1 | 8/2005 | DeBruyne |
| 7,504,961 B2 * | 3/2009 | Flanders ............ G05B 23/0264 |
| | | 137/487.5 |
| 8,056,390 B2 | 11/2011 | Filkovski et al. |
| 8,072,343 B2 * | 12/2011 | Flanders ............. F16K 37/0083 |
| | | 137/487.5 |
| 8,074,512 B2 | 12/2011 | Al-Buaijan |
| 8,540,211 B2 * | 9/2013 | Wheater ............. F16K 37/0091 |
| | | 251/129.04 |
| 8,720,267 B2 * | 5/2014 | Al-Buaijan ........... F15B 19/005 |
| | | 73/168 |

* cited by examiner

*Primary Examiner* — Peter Macchiarolo
*Assistant Examiner* — Jermaine Jenkins
(74) *Attorney, Agent, or Firm* — Hauptman Ham, LLP

(57) ABSTRACT

An emergency shut-off valve and means for initiating a test on said emergency shut-off valve includes a source of pressurized gas, a main solenoid responsive to a signal from said means for initiating a test and a source of pressurized gas are included. Further, means including a main solenoid responsive to a signal from said means for initiating a test and a main solenoid valve and a quick exhaust valve connected to the source of pressurized gas. Further, a pneumatic actuator for opening and closing the shut-off valve and test means for testing the emergency shut-off valve without fully closing the emergency shut-off valve in response to a signal from the means for initiating a test. The test means includes a second solenoid.

1 Claim, 3 Drawing Sheets

PARTIAL STROKE TESTING SYSTEM FOR EMERGENCY SHUT-OFF VALVES

FIELD OF THE INVENTION

This invention relates to a partial stroke testing system and more particularly to a partial stroke testing system for the online testing of an emergency shut-off valve with an additional element for safety.

BACKGROUND FOR THE INVENTION

In the oil, gas, petroleum and power industries, various conditions may occur that necessitate immediate shutdown or tripping of the operations, process or plant. In those industries a majority of the final control elements of a shut-off system are implemented with fast acting shut-off valves. In such industries a majority of the shut-off valves remain open while the process is in a safe and controlled state. Such valves are closed only upon a plant trip rising from an out-of-control process or during a normal maintenance outage.

In practice, the testing of emergency shut-off valves is normally done during shutdown of the process. However, there is a tendency for such valves to stick or freeze due to corrosion or other reasons, which lead to an unsafe condition. The problem is exacerbated by economic conditions which may lead to a reduction in the frequency of shut-offs. For example, in some operations, a process may run continuously for one or more years without shutting down the process for maintenance.

State of the art emergency shut-off systems which control the shut-off valves have a number of features to detect plant or process failures and typically include redundancies for added reliability. However, such systems may not provide for the testing of shut-off valves itself. Other than stroking the valve the problem is that full stroking or completely closing the valve causes an undesirable disruption in the process.

A U.S. Patent of Albuaijan U.S. Pat. No. 6,435,022 discloses a partial stroke testing system. That systems is designed for implementation on an emergency shut-off valve with a main solenoid with manual reset, main solenoid valve, quick exhaust valve and a pneumatic actuator connected to a source of pressurized air supply for opening and closing the emergency shut-off valve and wherein the shut-off valve is normally movable between a fully open and a fully closed position. The system of the aforementioned patent includes control means programmed into the plant emergency shutdown system controller for initiating a test and for enhancing the bleed rate from the pneumatic actuator in the event of an emergency trip signal. Test means for testing the emergency shut-off valve without fully closing the emergency shut-off valve is included in the system. The test means includes a second solenoid and a second solenoid valve for bleeding off pressurized air to thereby move the emergency shut-off valve from full opened position to partially closed position. The system also includes an isolation valve for isolating the test means for maintenance purpose.

A more recent U.S. Patent of DeBruyne U.S. Pat. No. 6,935,610 discloses a partial stroke valve test apparatus. The apparatus is operably inserted between an emergency shutdown valve and a valve actuator, and comprises a drive cam attached to a drive shaft interconnecting the valve and actuator and an engagement cam attached to an engagement shaft which can be rotated from an operational position to a testing position to bring the engagement cam into operable communication with the drive cam. A key is locked to the engagement shaft to rotate the engagement shaft, and can be removed only when the engagement shaft is in the operational position. A safety stop mechanism prevents the engagement shaft from inadvertently rotating out of the operational and testing positions. A spring-biased pin engages radially-spaced detent seats in the engagement shaft to provide a positive indication of the position of the engagement shaft.

Finally, a U.S. Pat. No. 8,074,512 of Al-Buaijan discloses a partial stroke testing system coupled with a fuel control valve. The system for testing an emergency shut-off valve includes a first emergency shut-off valve and a control for initiating a test on the first emergency shut-off valve. The system also includes a fluid actuator for opening and closing the first emergency shut-off valve. A subsystem is also provided for testing the first emergency shut-off valve without fully closing the shut-off valve in response to a signal from the control. In this system, a second solenoid valve bleeds off pressurized fluid to move the emergency shut-off valve from a fully opened to a partially closed position functions as a second emergency shut-off valve. A second emergency shut-off valve is provided in series with the first emergency shut-off valve and a bypass around the second emergency shut-off valve allows the second emergency shut-off valve to be tested by being fully closed without shutting down the process. The use of the two emergency shut-off valves in series wherein either valve can shut down the process raises the safety integrity level.

Recognizing that the emergency shut-off valves can be stroked partially as a safeguard against frozen or stuck or slowly closing valves has led to a need for a simple, secure and reliable system for testing such valves without adversely effecting production. This approach also improves the safety of the operation.

The present system is also applicable to slow acting valves.

In processes in the oil, gas, petroleum and power industries, fuel to power the heaters, boilers or the like is fed to the associated burners through a fuel control valve and a fuel shut-off valve. The fuel control valve regulates pressure flow to the burners whereas the shut-off valve is normally in a fully opened state. The shut-off valve closes to cutoff fuel supply in the event of an emergency. From the safety standpoint of view, the shut-off action of the shut-off valve is of utmost importance. The operability of the shut-off valve can be confirmed by means of the online valve partial stroke testing. However, any failure in the internals of the shut-off valve may be to a fuel leakage to the heater. Introduction of a solenoid valve in the pneumatic circuit of the fuel control valve driven by an emergency shut-off signal is conceived as a means for supplementing the fuel shut-off action and the redundancy to achieve higher safety standards.

In addition, the partial stroke testing system in accordance with the present invention will not interfere with a plant trip i.e., a full shutdown due to an emergency condition. Furthermore, if a partial stroke test is being conducted at the time of a plant trip, the partial stoke test will contribute to a more rapid closing of the emergency shut-off valve. Thus, the partial stroking design acts as a backup to the main trip mechanism.

Accordingly, such systems should reduce the costs of insurance or risk coverage. In essence, the system partially closes the emergency shut-off valve to a predetermined position to test and confirm its ability to function and to ensure its availability on demand in the event of a plant emergency.

BRIEF SUMMARY OF THE INVENTION

In essence, the present invention contemplates a partial stroke testing system for testing an emergency shut-off valve that is normally movable between fully opened and fully closed positions. The stroke testing system comprises or consists of an emergency shut-off valve and means for initiating a test on the emergency shut-off valve. The system further comprises or consists of a source of pressurized gas, a main solenoid response to a signal from the means for initiating a test on the emergency shut-off valve and a source of pressurized gas. In addition, the system includes a main solenoid response or valve for a response to a signal from the means for initiating a test. A main solenoid valve and quick exhaust valve are connected to the source of pressurized gas and a pneumatic actuator is provided for opening and closing the shut-off valve. The test means for testing the emergency shut-off valve without fully closing the emergency shut-off valve in response to a signal from the means for initiating a test. Further, the test means includes a second solenoid, a second solenoid valve for bleeding off pressurized gas to thereby move the emergency shut-off valve from a fully opened position to a partially opened position and wherein the test is based on the theory of pneumatic equilibrium.

A partial stroke testing system in accordance with the present invention will provide a low costs, simple and reliable test for emergency shutdown valves in the oil, gas, petrochemical and power industries. Such test will not adversely interrupt a process and will minimize or almost eliminate the risk of frozen emergency shut-off valves in the event of an out-of-control process. The system in accordance with the present invention is cost effective and has been designed to utilize a shut-off valve with a fast acting piston actuator and is also applicable to corroded systems that produce slow acting valves.

By applying the theory of pneumatic equilibrium for any containers/cylinders the time it takes to equalize the pressure $P_1=P_2$ between two cylinders (cylinder number one is having continuous $P_1=20$ PSI along with the air regulator as a source of supply and the second cylinder $P_2=0$ PSI). Then once connected and opened to each other the time delay is the time it takes when the cylinder number one equals the pressure in cylinder number two. The idea is to use this time delay for a partial stroke test when the valve is in use without affecting the process itself. Then, if the valve performs closing and opening smoothly within the reference time during testing it is considered that the valve is completely functional.

The invention will now be described in connection with the accompanying drawings wherein like reference numerals have been used to identify like parts.

DETAILED DESCRIPTION OF THE PREFERRED EMBODIMENTS OF THE INVENTION

Figure 1:
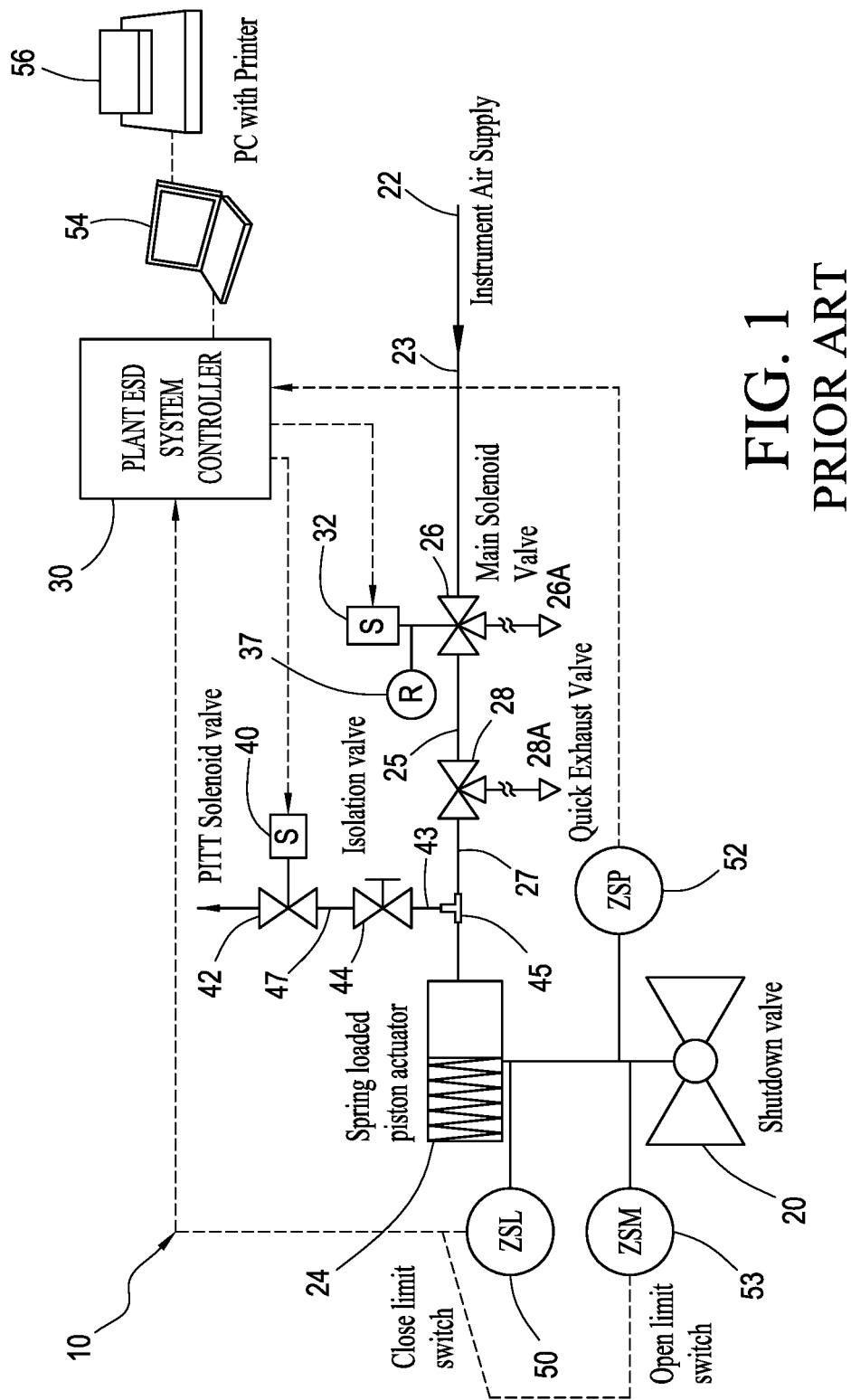
FIG. 1 is a schematic illustration of a prior art partial stroke testing system.

As illustrated in FIG. 1, a Prior Art, partial stroke testing system 10, incorporates a shut-off valve for use in the oil, gas, petrochemical and power industries. Such system is incorporated in an emergency shut-off valve 20 which remains in an open position during normal process conditions. Compressed air from a source 22 is used for maintaining the valve 20 in an open position. The compressed air maintains the valve 20 in an open position by driving a spring biased piston actuator 24. The compressed air is connected with the spring biased actuator 24 through a main solenoid valve 26 and a quick exhaust valve 28. The source 22 of compressed air is connected to the main solenoid valve 26, quick exhaust valve 28 and actuator 24 by tubing 23, 25 and 27.

In the event of a plant trip i.e. an out of control process, a signal as for example from a plant emergency shutdown system controller 30 actuates a solenoid 32 which closes the main solenoid valve 26 with respect to the pressurized air from the source 22 and allows the air from tubing 25 to exhaust through an exhaust port 26A. The release of pressure against the quick exhaust valve 28 opens an exhaust port 28A allowing the actuator 24 to bleed through tubing 27, quick exhaust valve 28 and exhaust port 28A and close the shut-off valve 20 and thereby shut down the process or plant.

The partial stroke testing portion of the system 10 includes a second solenoid 40 and second solenoid valve 42. That portion also includes an isolation valve 44. The second solenoid valve 42 is operatively connected to the actuator 24 through tubing 47, isolation valve 44, tubing 43 and a "T" connection 45 through tubing 27.

For partial stroke testing, a signal from the plant emergency shutdown system controller 30 energizes the second solenoid 40 which opens the second solenoid valve 42 to bleed off compressed air so that the spring biased actuator 24 partially closes the shut down valve 20. This partial closing is limited by partial stroke limit switch 52, which sends a signal to plant emergency shutdown system controller 30 in a conventional manner. The plant emergency shutdown system controller 30 de-energizes the solenoid 40 to thereby close the second solenoid valve 42 and the shut-off valve returns to fully open state. By limiting the movement of the shut down valve 20 by time or stroke, there is no interruption of the process. Nevertheless open limit switch 53 and partial stroke limit switch 52 provide signals to the plant emergency shutdown system controller 30 that the valve actually moved which indicate it is not frozen or stuck. Suitable sensing means such as a linear variable transducer can also be used to check that the valve 20 has in fact been displaced in response to the signal from the plant emergency shutdown system controller 30. If the linear variable transducer indicates that a preselected degree of deflection has occurred, the valve tested has been shown to be free to move.

Figure 2:
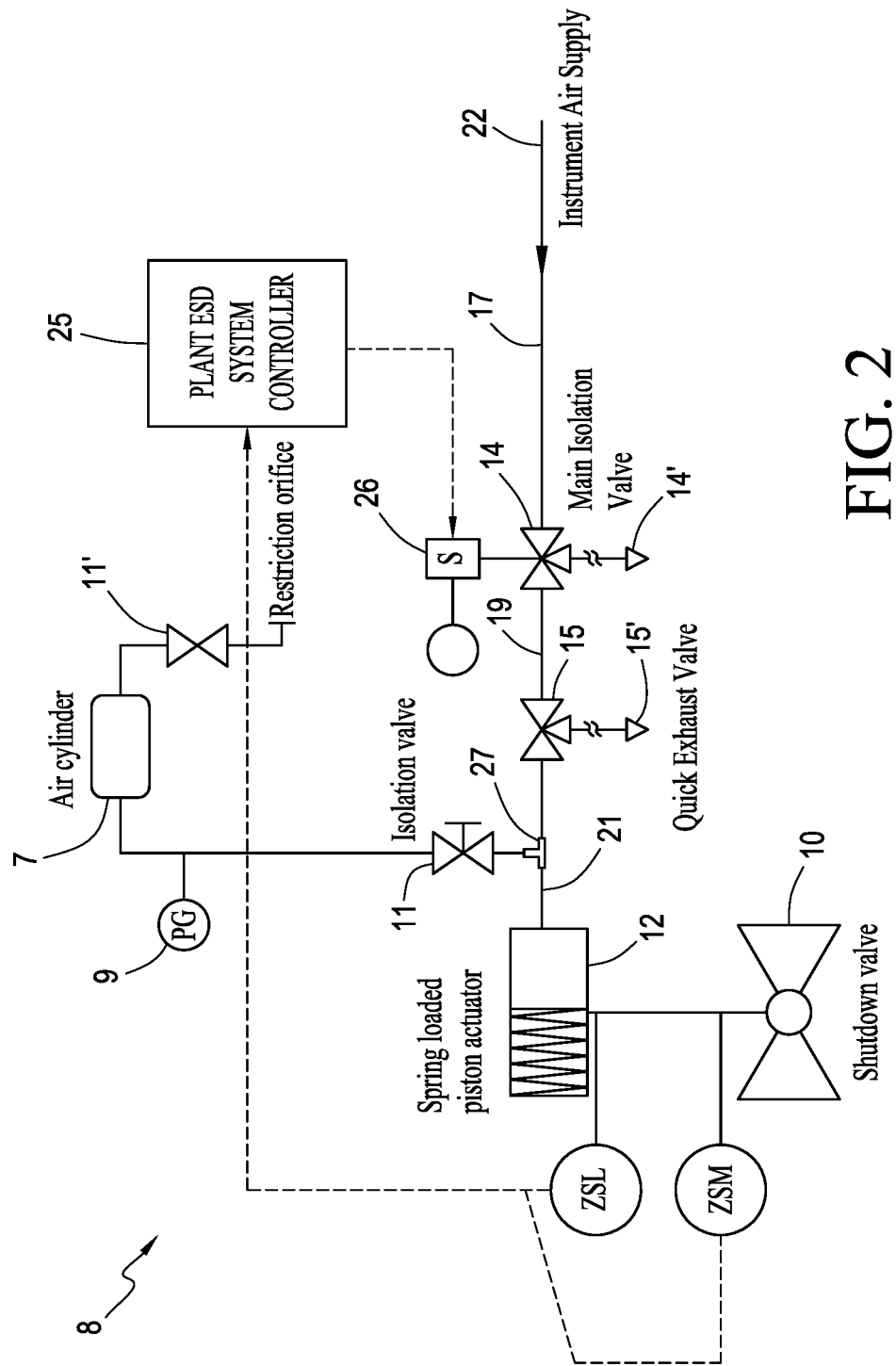
FIG. 2 is a schematic illustration of an improved stroke testing system in accordance with the present invention.

As illustrated in FIG. 2, a partial stroke testing system 8 incorporates a shut-off valve 10 for use in the oil, gas, petrochemical and power industries is illustrated in FIG. 1. Such system is incorporated in an emergency shut-off valve 10 which remains in an open position during normal process conditions. Compressed air from a source 22 is used for maintaining the valve 10 in an open position. The compressed air is connected with a spring biased actuator 12 through a main solenoid valve 14 and quick exhaust valve

15. The source 22 of compressed air is connected to the main solenoid valve 14, quick exhaust valve 15 and actuator 12 by tubing 17, 19 and 21.

In the event of a plant trip i.e., an out-of-control process, a signal as for example from the plant emergency shutdown system controller 25 actuates a solenoid 26 which closes the main solenoid valve 14 with respect to the pressurized air from the source 22 and allows the air from tubing 17 to exhaust through an exhaust port 14A. The release of pressure against the quick exhaust valve 15 opens an exhaust port 15A allowing the actuator 12 to bleed through tubing 21, quick exhaust valve 15 and exhaust port 15A and close the shut-off valve 10 and thereby shutdown the process or plant.

The partial stroke testing portion of the system 10 includes a second isolation valve 11 operatively connected to the actuator 14 through tubing 13, isolation valve 11, tubing 13 and T-connection 27.

For a partial stroke test a signal from the plant emergency shutdown system controller 25 energizes a solenoid 26 to bleed off compressed air so that the spring biased actuator 12 partially closes the shutdown valve 10. This partial closing is limited by partial stroke limit switch (ZSL) 50 which sends a signal to plant emergency shutdown system controller 25 in a conventional manner. The plant emergency shutdown system controller 25 deenergizes the solenoid 26 to thereby close 26A and the shut-off valve returns to fully opened state. By eliminating the movement of the shutdown valve 20 or stroke there is no interruption to the process. Nevertheless, open limit switch ZSM and partial stroke limit switch 52 provide signals to the plant emergency system controller 25.

However, if the sensing means indicates that the deflection has not occurred a signal is sent to the plant emergency shutdown system controller 25 indicative of the fact. A suitable alarm is provided to indicate that the valve is stuck and to initiate corrective action.

The magnitude of the displacement may be any suitable degree to positively indicate that one valve movement is possible but must not be of such magnitude as to disrupt the process of the plant operation and will ordinarily be accomplished by a 10% opening and return.

The plant emergency shutdown system controller 25 may be interfaced to a computer to initiate periodic partial stroking of the shut-off valve 10. The computer is also used to record the result of each test which may be printed out on printer 37. The isolation valve 11 isolates the shut-off valve system for maintenance without affecting the operation of the shut-off valve.

The manual latches facility in the main solenoid valve allows the operator to manually open the shut-off valve after field verification, subsequent a trip and reset of the trip signal.

The control signal is for conducting the partial stroke test of shut-off valve 10 and is programmed into the plant emergency shutdown system controller 25 as illustrated in FIG. 2. The partial instrument strip testing (PITT) or partial stroking of the shut-off valve is initiated by the plant emergency shutdown system controller 25 (FIG. 2) by initiating the execution of the programs sequence illustrated, see FIG. 2. The plant emergency shutdown system controller 25 energizes a power supply to the solenoid 40 of the solenoid valve 42 and start an internal timer. On energization of the solenoid 40 (FIG. 2) the solenoid valve 42 opens and bleeds the actuator air supply causing the actuator 24 to move the shut-off valve 20 toward the closed position.

The shut-off valve movement to partial movement is checked. If the shut-off valve 20 has reached the partial limit the program sequence proceeds to deenergize the solenoid 40 to close the solenoid valve 42 and stop the timer. The actuator 24 on closure of the solenoid valve 42 gets full air supply and drives the shut-off valve to a fully open position. The program sequence then proceeds to set the status of the test as passed for generating test reports and archiving of test data. After generating the test report and achieving the test data a valve tag (test status and test duration) the test control sequence is terminated and diverted to other applications of the plant emergency shut-down system controller 30.

In the event that the shutdown valve has not closed to its partial limit and the test timer PM has not timed out a second sequence returns and either the valve reaches the partial limit or the timer runs out.

In the event that the shut-off valve has not closed to its partial limit in step 64 and the PITT timer has timed out the control sequence goes to deenergize the solenoid 40 to close the solenoid valve 42. The generator on closure of the solenoid valve 42 gets full air supply and drives the shut-off valve 20 to a fully open position. The program sequence then proceeds to set the status of the test as fail and to a step for generating a test report and achieving the test data after generating the test report. Archiving the test data. The test control sequence is terminated and diverts other applications into plant emergency shutdown system controller.

Figure 3:
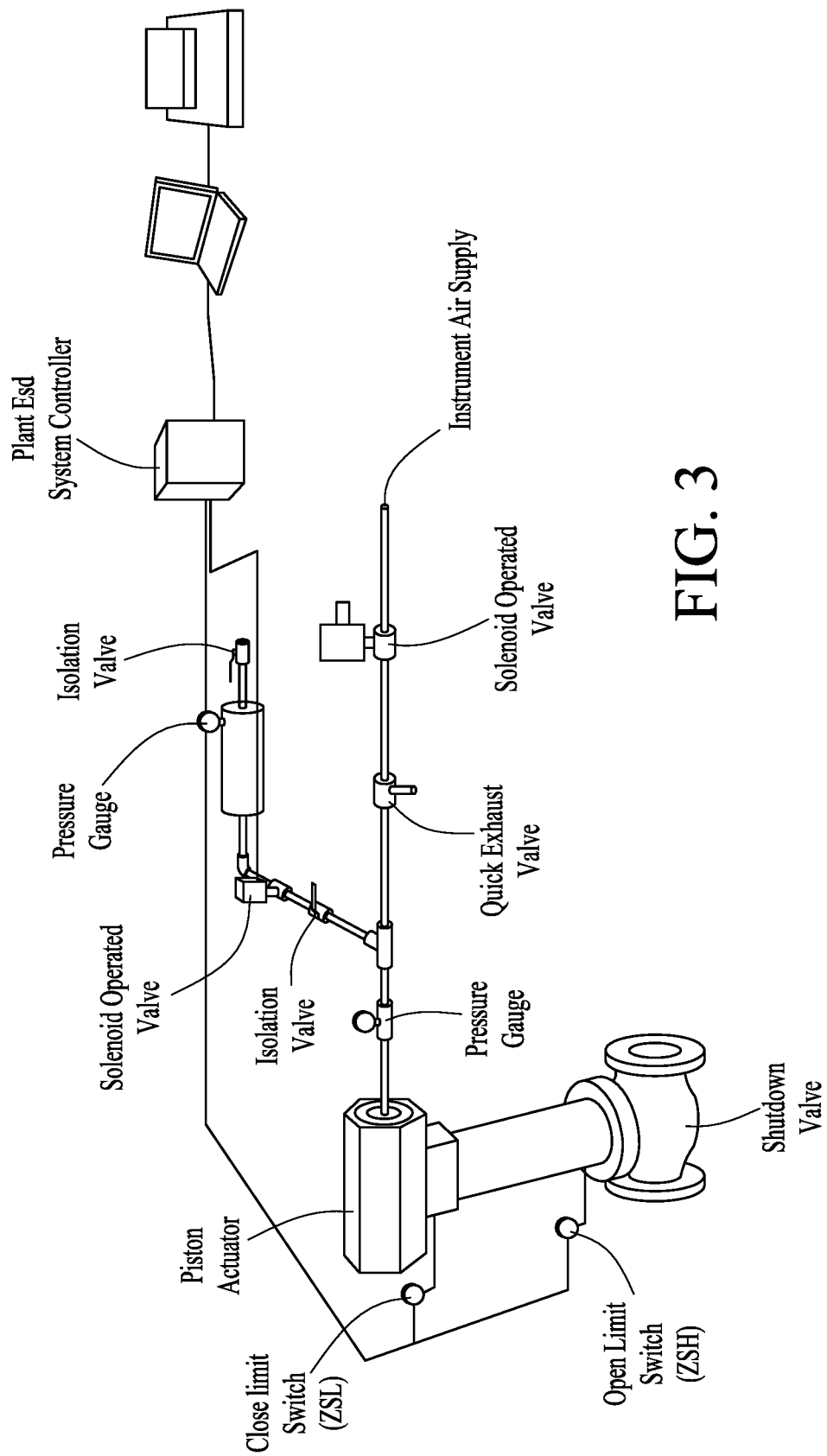
FIG. 3 is a schematic illustration illustrating the prior art elements and the elements added in the improved stroke testing system in accordance with the present invention.

A bleed enhancement scheme in accordance with one embodiment of the invention is illustrated in FIG. 3. The bleed enhancement is archived by implementing the control scheme as indicated in FIG. 3 in the plant emergency shutdown system controller 30 as an application program routine. The program is initiated in the event of an emergency strip signal on an emergency shutdown system controller issues a trip signal to energize the main solenoid valve, energizes the PITT solenoid valve 42 and starts a valve stroke timer. The PITT solenoid valve 42 will remain energized when the valve stroke timer continues to run as indicated until the shut-off valve is fully closed. Upon full closure of the shut-off valve the timer is stopped. The plant emergency shutdown controller will then generate a full stroke report and archive the valve stroke time data. Upon completion of the report generated data archiving task the controlled sequence is terminated and diverted to other applications in the plant emergency shutdown system controller.

By applying the theory of pneumatic equilibrium for any containers/cylinders the time it takes to equalize the pressure wherein P1=P2 between two cylinders (cylinder one has a continuous pressure of PSI along with an air regulator as a source of supply. The other cylinder number two the pressure is equal to 0 PSI. Once they are connected to one another there will be a time delay i.e., the time it takes when cylinder one is equal to the pressure in cylinder two. The idea is to use this time delay for partial stroke test when the valve is in use without affecting the process area i.e., a partial stroke test. If the valve performs closing and opening smoothly within the reference time during testing the valve is considered fully functional.

The prior art depends on additional limit switch/soft Timer limits and others to safe guard unexpected faults.

With all safe guards provided. In some conditions during testing, flow switch may trip the process unit due to cycle time of Shut down system (most S/D valves are designed for 1 second travelling time) against the fast travelling.

Thus companies will not take a risk to implement such an approach and they will not do it.

Equilibrium has zero risk (This is a major advantage of the present invention).

New cylinder 10 is added has a known size. During testing the new Solenoid valve added is to allow the air to pass toward the new cylinder. The air will be trapped in the new cylinder until valve moves (start closing due to low pressure) and return back to its position (once both valve actuator and new cylinder pressure equalize) then the new solenoid will close cutting the air toward the new cylinder. This is a complete test.

Performing an equilibrium test. We are eliminating any other need for safeguards because they are not needed.

The addition of a restriction orifice/pressure gauge 9 and manual valve 11 are not needed during testing at all. It is required only to the reset system.

The restriction orifice/pressure gauge and manual valve 11 is used only after successfully valve tested, you will need to open the manual valve to release the trapped air pressure in the new cylinder through restriction orifice (restriction orifice is added only to make sure releasing air pressure in new cylinder is negligible) and to make sure the pressure Gauge added is reading zero. After that you could perform a new test.

The restriction orifice is added for safety. In case the manual valve no 11 is forgotten open by mistake during partially testing the valve. The Valve will close around 10% and will remains in position due to air cylinder no 10 not reaching the pressure required to reopen the valve, which means test is failed. Noted that if this mistake occurs. It will not have any effect on the process.

Any XV (shutdown valve) has a built in limit switches by manufacture in order to make sure that the valve is fully open (100% open) and fully closed (zero pass).

Applicant is using the existing limit switches showing 100% open.

Limit switch function: once the valve leaves the 100% open position the indication will change to show that valve are not any more in fully open with time stamp in DCS. And once pressure rebuilt, the valve will return back for fully open 100% with also time stamp in DCS.

Meaning that valve starts closing (not stuck).

Repeating the test (PST) and comparing the time stamped (no significant time different) between leaving the position of 100% opening and coming back to 100% with repeated test.

Meaning valve is moving smoothly (no jerk).

Any pneumatic valve needs 4-20 psi to open or close. If the valve is normally closed then the valve need 20 psi to open 100%.

| Pressure/input | Normally open valve/ output | Normally close valve/ output |
| --- | --- | --- |
| 4 psi | 100% | 0% |
| 8 psi | 75% | 25% |
| 12 psi | 50% | 50% |
| 16 psi | 25% | 75% |
| 20 psi | 0% | 100% |

During equalizing the pressure between valve actuator and new cylinder the pressure will drop below 20 psi which forces the valve to start closing and once pressure rebuilt to 20 psi the valve will reopen 100%.

While the invention has been described in connection with the above-identified preferred embodiments, it should be recognized and understood that changes and modifications may be made therein without departing from the scope of the appended claims.

What is claimed is:

1. A partial stroke testing system for testing an emergency shut-off valve that is normally movable between fully opened and fully closed positions, said system consisting of:
    an emergency shut-off valve, means for initiating a test on said emergency shut-off valve, a source of pressurized gas, a main solenoid and means including said main solenoid responsive to a signal from said means for initiating a test on said emergency shut-off valve, and means including a main solenoid responsive to a signal from said means for initiating a test, said main solenoid valve and a quick exhaust valve connected to said source of pressurized gas, and a pneumatic actuator for opening and closing said shut-off valve, test means for testing said emergency shut-off valve without fully closing said emergency shut-off valve in response to a signal from said means for initiating a test, said test means including a second solenoid, a second solenoid valve for bleeding off pressurized gas to thereby move said emergency shut-off valve from a fully opened position to a partially closed position and wherein said test is based on the theory of pneumatic equilibrium.

* * * * *